Figure 4:
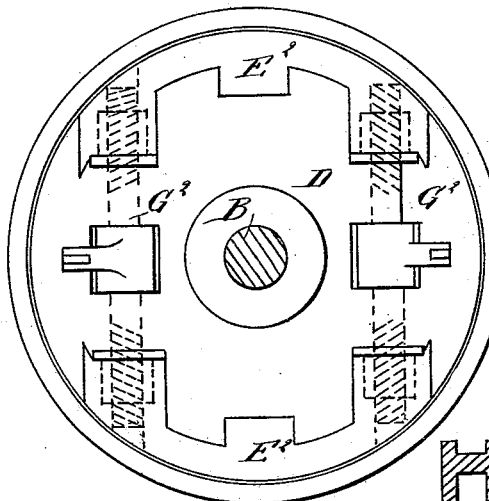

(Model.) 2 Sheets—Sheet 1.
E. A. BEYER.
HOISTING DRUM.
No. 243,837. Patented July 5, 1881.
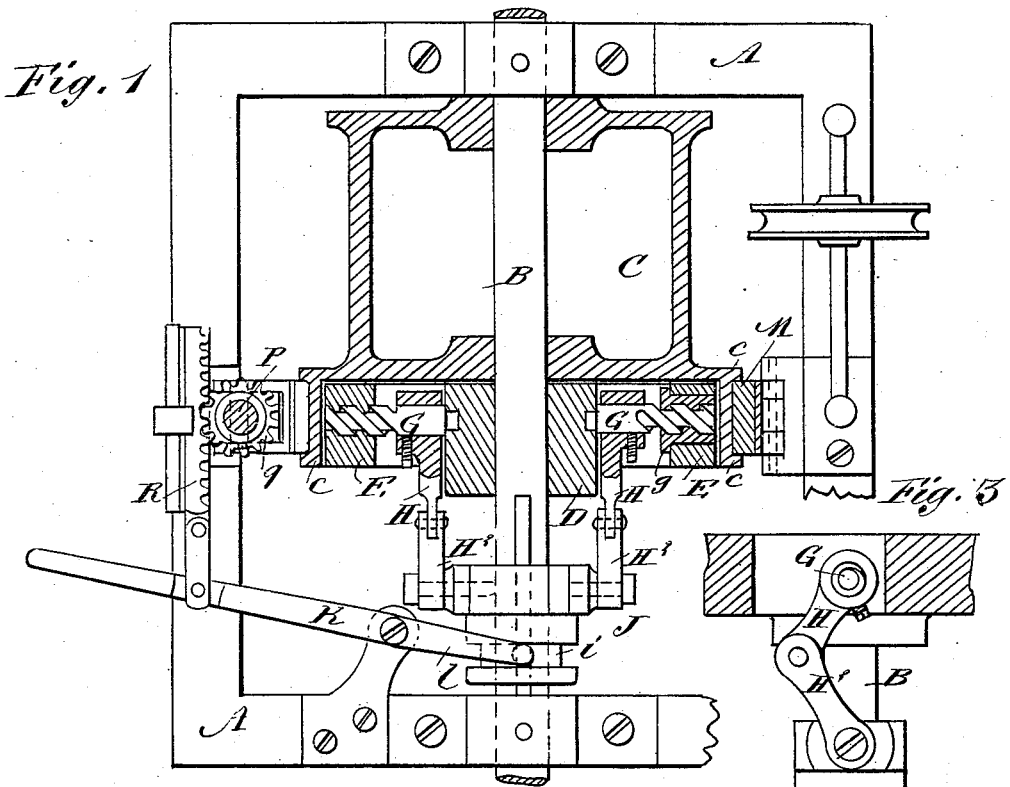
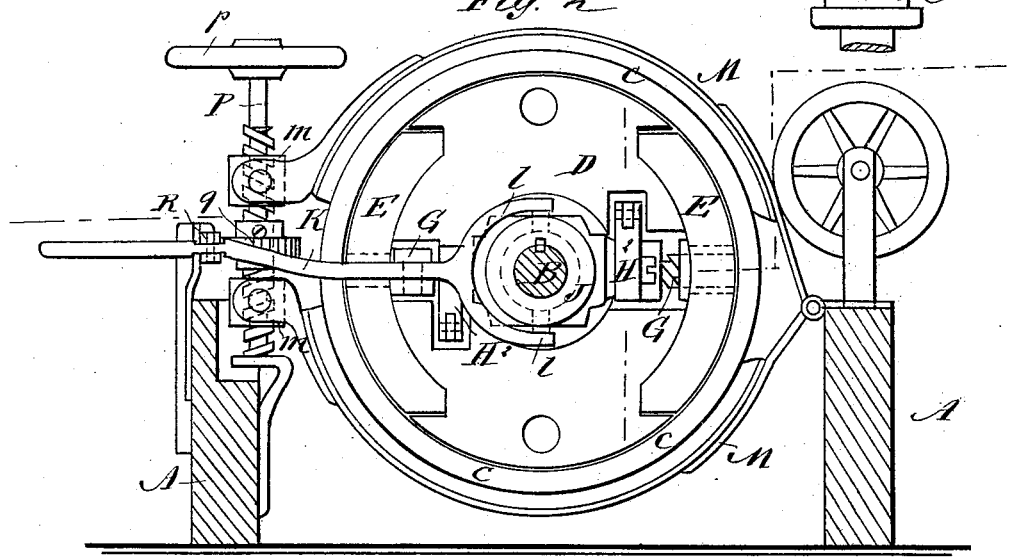
WITNESSES: C. Neveux, C. Sedgwick
INVENTOR: E. A. Beyer
BY Munn & Co.
ATTORNEYS.

(Model.)  2 Sheets—Sheet 2.

E. A. BEYER.
HOISTING DRUM.

No. 243,837.  Patented July 5, 1881.

WITNESSES:
C. Neveux
C. Sedgwick

INVENTOR:
E. A. Beyer
BY Munn & Co.
ATTORNEYS.

UNITED STATES PATENT OFFICE.

EDWARD A. BEYER, OF NEGAUNEE, MICHIGAN.

HOISTING-DRUM.

SPECIFICATION forming part of Letters Patent No. 243,837, dated July 5, 1881.

Application filed May 10, 1881. (Model.)

*To all whom it may concern:*

Be it known that I, EDWARD A. BEYER, of Negaunee, in the county of Marquette and State of Michigan, have invented certain useful Improvements in Hoisting-Drums, of which the following is a specification.

My invention relates to means for connecting and disconnecting a hoisting-drum and its driving-shaft, and also to a brake for checking its speed when in motion.

The invention consists in combining with hinged bars nuts pivoted to their ends and a shaft carrying a right-and-left screw, as hereinafter described.

In the accompanying drawings, Figure 1 is a horizontal sectional view of an apparatus embodying my improvements. Fig. 2 is an end view of the same, partly in section. Fig. 3 is a detail view. Figs. 4, 5, 6, 7, and 8 are views of modifications hereinafter more particularly described.

A represents a frame-work of any suitable description, provided with bearings in which works a shaft, B. The drum C is arranged to work loosely on the shaft B, except as hereinafter described.

At one end of the drum is formed a rim, c, in which works a circular plate, D. This plate is keyed to the shaft B, so as to turn therewith. At two opposite points in the circumference of the circular plate D are recesses, in which work segmental or arc-shaped shoes E. Between each shoe E and the hub or center of the plate D is a screw, G, the threads of which engage with the threads in the shoe. To the head of each screw is attached an arm, H, the outer end of which is pivoted to one end of a bar, $H^2$, thus forming a toggle-lever. The other end of the bar $H^2$ is pivoted to a collar, J, which is keyed on the shaft B, so as to turn therewith, but be allowed to slide thereon. The collar J is provided with a peripherical groove, i, in which work the forks l of a lever, K, pivoted in any suitable manner to the frame A. When the lever K is moved in one direction the toggle-lever H $H^2$ acts upon the screw G so as to cause it to press the shoe outward and against the inner surface of the rim c of the drum, to turn when the shaft B turns. When the lever K is moved in the opposite direction the shoe is withdrawn from contact with the rim c, and the shaft B and plate D are free to revolve without turning the drum. If desired, instead of engaging with threads in the shoe, the screw G may engage with a flanged nut, g, working in a smooth hole in the shoe, as shown at the right-hand side of Fig. 1.

The brake is composed of two semicircular bars, M M, hinged together and to the frame A at their inner ends, and embracing between them the portion of the drum forming the rim c. At their outer ends they are provided with pivoted nuts m m, which are engaged by screw-threads on a shaft, P, provided with a hand-wheel, p, one of said threads being a right-hand thread and the other a left-hand thread. By turning the shaft P in one direction the brake is applied, and by turning it in the other direction the brake is taken off.

The shaft P is provided between its screw-threads with a pinion, q, which engages with a sliding rack, R, having one end connected to the lever K. By this arrangement both the brake and the shoes can be operated simultaneously by either vibrating the lever K or turning the hand-wheel p. When either the lever or the hand-wheel, or both, are moved to the extreme limit in one direction the shoes are thrown into engagement with the rim c and the brake is taken off. When moved to the extreme limit in the opposite direction the shoes are disengaged and the brake is applied, and when moved about midway between said extreme limits both the brake and the shoes are disengaged and the drum can turn on the shaft.

In Fig. 4 is shown a modification of the shoes. Instead of having one radial screw for each shoe, I employ two screws, $G^2$, for each shoe $E^2$. Each screw is provided with a right-hand thread on one end and a left-hand thread on the other, so that by turning the two screws in one direction the shoes are thrown into engagement, and by turning them in the opposite direction they are disengaged.

Figure 5:
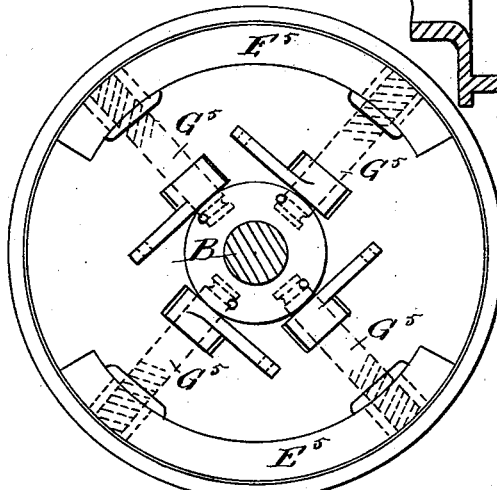

In Fig. 5 is shown another modification. There are two screws, $G^5$, to each shoe $E^5$, and said screws are arranged radially.

Figure 6:
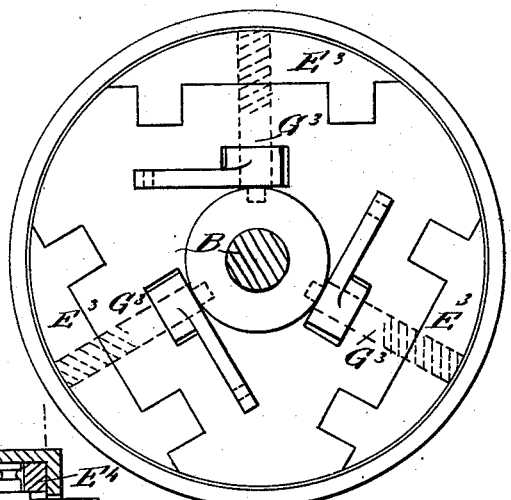

In Fig. 6 is shown another modification. Instead of two, there are three shoes, $E^3$, and the three screws $G^3$ are arranged radially and operate in substantially the same manner as in Figs. 1 and 2.

Figure 8:
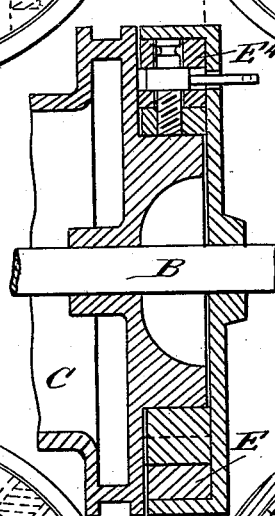
Figure 7:
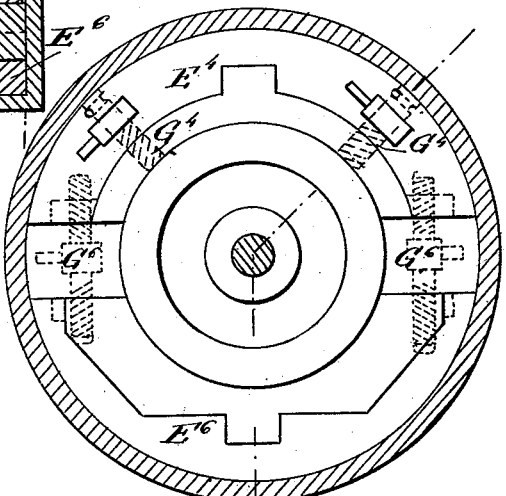

In Figs. 7 and 8, instead of being only a short arc, the shoes are shown as comprising nearly or quite a semicircle. The shoe $E^4$ is shown as provided with two screws, $G^4$, arranged radially. The shoe $E^6$ is shown as provided with two screws, $G^6$, arranged segmentally.

It is, of course, understood that in the cases above described the screws are connected with the toggle-levers $H$ $H^2$.

Having thus fully described my invention, I claim as new and desire to secure by Letters Patent—

The combination, with the hinged bars M M, of the nuts $m$ $m$, pivoted to their ends, and the shaft P, carrying a right-and-left screw, as shown and described.

EDWARD A. BEYER.

Witnesses:
C. A. FAHRMAN,
BYRON D. JONES.